United States Patent [19]

Shock et al.

[11] Patent Number: 4,661,935
[45] Date of Patent: Apr. 28, 1987

[54] SEISMIC DATA PROCESSING

[75] Inventors: Clifford L. Shock, Bartlesville, Okla.; Colin Johnson, London, England

[73] Assignee: Phillips Petroleum Company, Bartlesville, Okla.

[21] Appl. No.: 651,733

[22] Filed: Sep. 17, 1984

[51] Int. Cl.$^4$ .......................... G01V 1/34; G01D 7/02
[52] U.S. Cl. ........................................ 367/70; 367/47; 367/48; 346/33 C
[58] Field of Search ...................... 367/47, 48, 70, 110; 346/33 C, 46; 343/5 CD

[56] References Cited

U.S. PATENT DOCUMENTS 3,781,785 12/1973 Balch .................................... 367/70
3,986,160 10/1976 Turner .................................. 367/110
4,467,461 8/1984 Rice et al. ............................ 367/110

FOREIGN PATENT DOCUMENTS 2497578 7/1982 France .................................. 367/70
2090660 7/1982 United Kingdom ................ 367/70

OTHER PUBLICATIONS

Taner et al., "Complex Seismic Trace Analysis", 6/79, pp. 1041-1063, Geophysics, vol. 44, No. 6.
Sheriff et al., "Geologic Interpretation ... Trace", 5/77, pp. 829-830, AAPG Bulletin, vol. 61, #5.

Primary Examiner—Nelson Moskowitz
Attorney, Agent, or Firm—French and Doescher

[57] ABSTRACT

A variable amplitude/phase color seismic display is provided which increases the ease with which interpreters can locate peaks, troughs and other information of interest.

11 Claims, 10 Drawing Figures

SEISMIC DATA PROCESSING

This invention relates to seismic data processing. In one aspect, this invention relates to a method for producing an enhanced seismic display from a plurality of seismic wiggle traces.

The seismic method of mapping geological subsurfaces involves the use of a source of seismic energy and its reception by an array of seismic detectors, generally referred to as geophones. When used on land, the source of seismic energy generally is a high explosive charge electrically detonated in a bore hole located at a selected grid point in a terrain or is an energy source capable of delivering a series of impacts to the earth's surface such as that used in Vibroseis. The acoustic waves generated in the earth by the explosion or impacts are transmitted back from strata boundaries and reach the surface of the earth at varying intervals of time, depending on the distance and the nature of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signals representative thereof from which data may be deduced concerning the geological subsurface of the earth. Such electrical signals are generally referred to as seismic wiggle traces.

A typical array of seismic sources and detectors is illustrated in FIG. 1. A plurality of seismic sources 21-25 and a plurality of seismic receivers 31-35 are arranged around a common midpoint. For the sake of illustration, the seismic sources are equidistantly spaced and the seismic receivers are equidistantly spaced but this is not required and typically would not occur in seismic prospecting because of obstructions and other factors. However, each source-receiver pair would be equally spaced from the common midpoint to the extent possible. Assuming a reflecting plane 37 which is substantially parallel to the surface on which the sources and receivers are located, acoustic waves from each of the seismic sources is reflected from the common depth point and received by a respective one of the seismic receivers as is illustrated. The output from the seismic receivers 31-35 might be as illustrated in FIG. 2.

The group of seismic wiggle traces illustrated in FIG. 2 is typically referred to as a common depth point gather since all of the wiggle traces result from reflections from the common depth point. In some instances, a common depth point gather such as that illustrated in FIG. 2 is utilized by interpreters directly. However, more commonly, the seismic wiggle traces, such as illustrated in FIG. 2, are summed to produce a composite trace for enhancing the subsurface structure information represented by the features of the seismic wiggle traces. The result of such a summation is a single seismic wiggle trace for the common depth point. The purpose of such summing is to give prominence to some of the important features in the seismic signal and to reduce or remove those features which obscure the important parts of the signal. A result of a common depth point stack for a plurality of common depth points is illustrated in FIG. 3. FIG. 3 would generally be referred to as a vertical seismic section of stacked data.

While data such as that illustrated in FIG. 3 is very commonly used by interpreters of seismic data it is sometimes very difficult to pick peaks and troughs from such data. As used herein, the term "peak" refers to a point such as the point A on trace $R_{35}$ in FIG. 2. The term "trough" refers to a point such as the point B on trace $R_{35}$ in FIG. 2.

It is thus an object of this invention to provide a method for producing an enhanced seismic display from a plurality of seismic wiggle traces such as illustrated in FIG. 3. By enhanced seismic display it is meant that information such as the location of peaks and troughs and other information of interest to interpreters can be more easily obtained from the seismic display of the present invention than from the plurality of seismic traces from which the seismic display is generated.

In accordance with the present invention, a plurality of seismic wiggle traces, such as those illustrated in FIGS. 2 and 3, which are considered real seismic traces, are converted into imaginary seismic traces. The instantaneous phase of the complex seismic wiggle traces (composite of real and imaginary) is then determined at a plurality of sample points. Also, the amplitude, real or envelope, at the sample points is determined. A color is then assigned to each sample point based on the amplitude and the instantaneous phase for such sample point. A seismic display is then generated using such assigned colors. The result, which is sometimes referred to hereinafter as a variable amplitude/phase seismic display, enhances continuity of reflection events, provides a clearer picture of the location of pinchouts, emphasizes small scale faults and is more useful for reflection character correlation than a display such as that illustrated in FIG. 3.

As used herein, the phrase "real seismic wiggle trace" refers to a seismic wiggle trace as actually recorded. The phrase "imaginary seismic wiggle trace" refers to the Hilbert transform of the real seismic trace. The phrase "complex seismic wiggle trace" refers to a composite trace consisting of a real trace, which is identical to the real seismic wiggle trace, and an imaginary trace which is the Hilbert transform of the real seismic wiggle trace.

Other objects and advantages of the invention will be apparent from the foregoing brief description of the invention and the claims as well as the detailed description of FIGS. 4–10.

All of the drawings are briefly described as follows.

Figure 1:
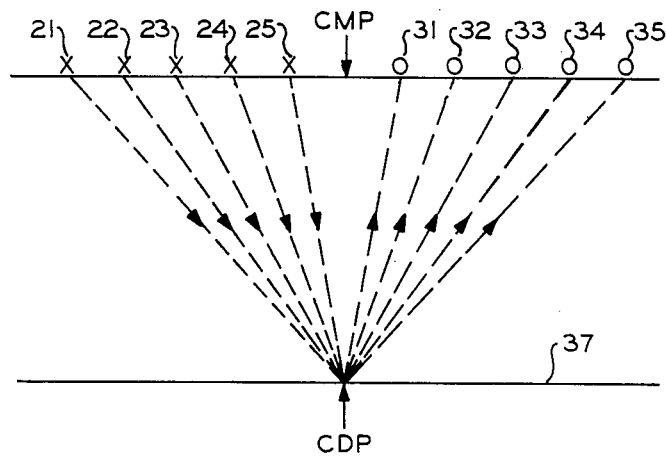
FIG. 1 is an illustration of a typical seismic exploration array.
Figure 2:
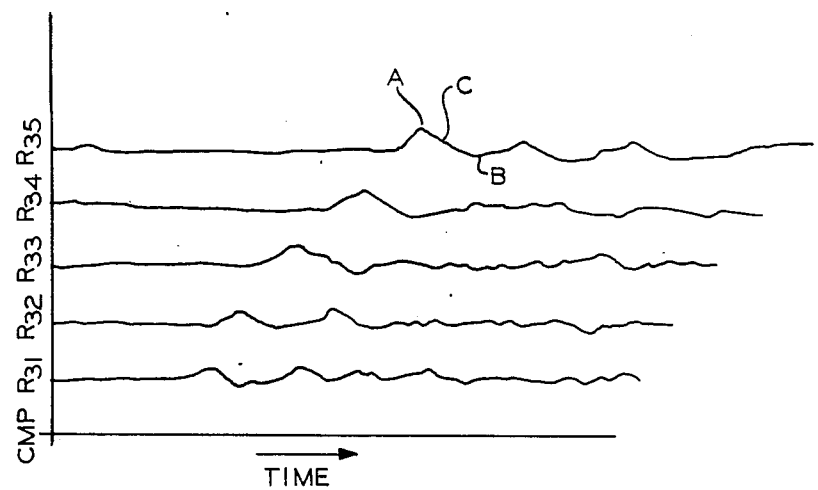
FIG. 2 is an illustration of the waveforms which might be received from the seismic array illustrated in FIG. 1.
Figure 3:
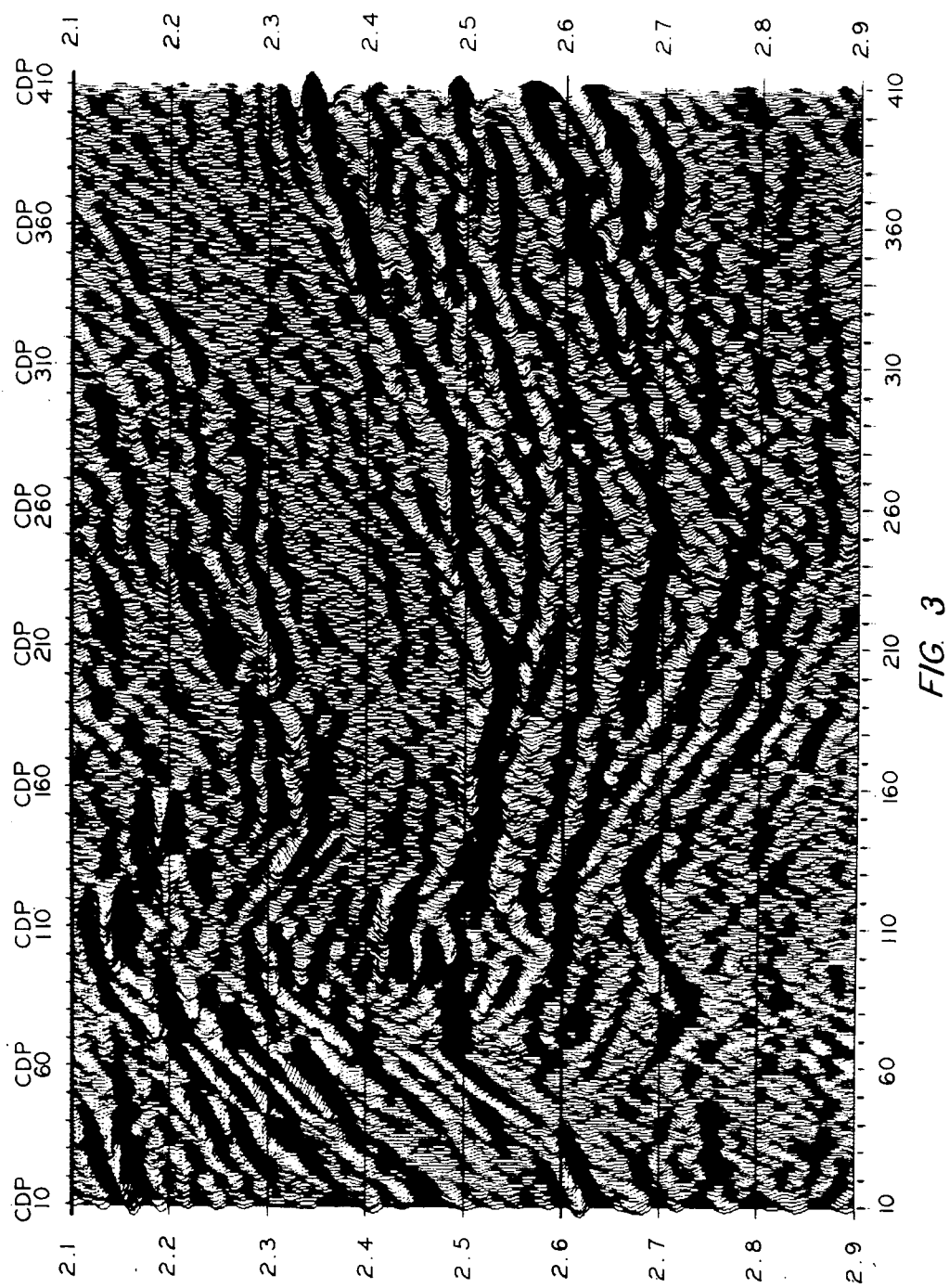
FIG. 3 is an illustration of a plurality of seismic wiggle traces which have been common depth point stacked.

The invention is described in terms of common depth point stacked data such as that illustrated in FIG. 3 because this type of data is commonly used to determine features of the subsurface of the earth. However, the invention may be applied to any suitable set of seismic wiggle traces. As an example, the invention may be applied to a common depth point gather set of seismic wiggle traces such as that illustrated in FIG. 2. Also, the invention may be applied to three-dimensional data such as will be illustrated in the examples.

The steps utilized to produce the variable amplitude/phase seismic display of the present invention from a plurality of seismic wiggle traces such as illustrated in FIG. 3 are as follows. Some of the steps may be accomplished in a different order if desired.

1. SELECT SAMPLE RATE

A sinusoidal wiggle trace obtained in reflection seismology typically has a length in the range of about 4 seconds to about 8 seconds. A 6 second length is typical.

Any suitable data sample rate may be utilized for such a sinusoidal wiggle trace. However, the data sample rate should be such as to provide sufficient data points to provide meaningful statistics. The data sample rate will typically be in the range of about 2 milliseconds to about 4 milliseconds with a 4 millisecond sample rate being preferred.

2. DETERMINE AMPLITUDE

Once a data sample rate has been established, the amplitude of each real seismic trace at each sample point is preferably determined. The real amplitude is available directly from real seismic wiggle traces, such as are illustrated in FIG. 3, as is well known to those skilled in the art of interpretation of seismic data.

It is noted that the real amplitude as opposed to the envelope amplitude is preferred but envelope amplitude can be used if desired. The real amplitude refers to the actual amplitude of the real seismic wiggle trace at the sample point. The envelope amplitude at a sample point refers to the square root of the sum of the squares of the real and imaginary amplitudes of the complex seismic trace at that sample point. Use of real amplitude as opposed to envelope amplitude allows clearer delineation of faults and pinchouts, makes correlation across small faults easier and generally provides for easier interpretation of the variable amplitude/phase seismic display. Thus, while envelope amplitude can be used if desired and will provide beneficial information, the discovery of the benefits of using real amplitude as opposed to envelope amplitude is a particularly important part of the present invention.

3. CALCULATE IMAGINARY SEISMIC TRACE FROM REAL SEISMIC TRACE

Hilbert Transform is applied to a real seismic wiggle trace to convert the real seismic trace to an imaginary seismic trace. Such an application of the Hilbert Transform is described in an article entitled Application Of Amplitude, Frequency, and Other Attributes To Stratigraphic and Hydrocarbon Determination, by M. T. Tanner and R. E. Sheriff, which appeared in Memoir 26, Seismic Strategraphy—Applications to Hydrocarbon Exploration, which was edited by Charles E. Payton, American Association of Petroleum Geologists, 1977.

4. DETERMINE INSTANTANEOUS PHASE OF COMPLEX SEISMIC TRACE

The instantaneous phase of the complex seismic trace at a sample point P(t) is defined by equation 1

$$P(t) = \tan^{-1}[h(t)/g(t)] \tag{1}$$

where h(t) is the amplitude of the imaginary seismic trace at the sample point and g(t) is the amplitude of the real seismic trace at the sample point. Again, the amplitude is available directly from both the imaginary seismic trace and real seismic trace.

5. INTERPOLATION

Colors may be assigned for only the sample points, as will be described more fully hereinafter, if desired. However, using only the sample points may result in a variable amplitude/phase seismic display which has an unpleasing appearance and which may be difficult to interpret. Preferably, image enhancement techniques are utilized to provide better apparent resolution.

Essentially, a plurality of points is selected between two sample points. An amplitude and instantaneous phase is assigned to each such point such that a smooth transition in colors between two sample points is provided.

The number of points filled in will vary depending upon the scale of the seismic display and also depending upon the plotting equipment. Preferably, sufficient points are filled in to provide a smooth color transition regardless of the scale or the plotting equipment used.

6. GRAPHICS PROCESSING

Once a real amplitude and an instantaneous phase has been assigned to each point which is to appear in the variable amplitude/phase seismic display, colors are assigned to each point based on the real amplitude and instantaneous phase.

Any suitable color scheme may be utilized. At least four distinguishable colors or distinguishable shades of color are required. However, larger numbers of colors or shades of colors are preferred because more colors or shades of colors give better apparent resolution which gives a more pleasing appearance and allows for greater ease in interpretation. In particular, the use of four colors for phase is extremely beneficial as will be described more fully hereinafter.

Figure 4:
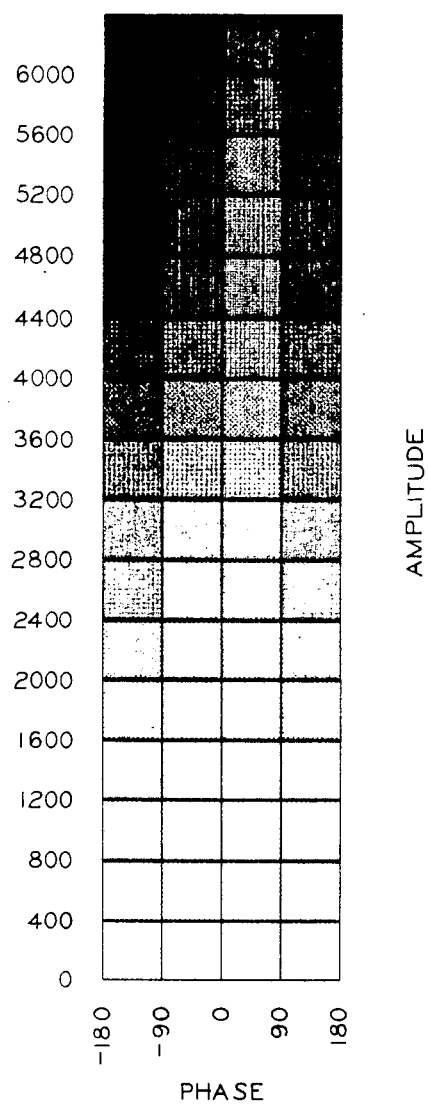
FIG. 4 is an illustration of a preferred set of colors for use in generating a variable amplitude/phase seismic display in accordance with the present invention.

A preferred set of colors used with an Applicon plotter is illustrated in FIG. 4. Referring now to FIG. 4, sixteen shades of the four basic colors (green, blue, pink and orange) are utilized. Each shade of color is representative of a different amplitude with the darkest color preferably being representative of the highest amplitude and the lightest color being representative of the lowest amplitude. The range between the highest amplitude and lowest amplitude is preferably divided into equal intervals with each shade of color being representative of such an interval. For FIG. 3, as an example, the amplitudes range from 0 to 6,000 and each shade covered a range of 400.

Each of the four colors illustrated in FIG. 4 is representative of a phase range. The range assigned for the colors of FIG. 4 is as follows:

| Color | Range |
| --- | --- |
| green | −90° to −180° |

| Color | Range |
| --- | --- |
| blue | 0° to −90° |
| magenta | 0° to +90° |
| orange | +90° to +180° |

Less than four colors can be utilized for the phase if desired. As an example, the green of FIG. 4 could represent 0° to −180° and the blue could represent 0° to +180°. However, the use of fewer than four colors will result in a loss of some information. Likewise, more than four colors could be utilized. However, again, the use of more than four colors will result in the loss of information as is more fully described hereinafter.

Seismic peaks occur at 0° phase. Seismic troughs occur at + or −180° phase. Seismic zero crossings, such as point C illustrated in FIG. 2, occur at + or −90° phase.

Because of these relationships, it has been discovered that the use of four colors covering the ranges illustrated in FIG. 4 is particularly desirable. A transition between colors immediately informs an interpreter that an event of interest (peak, trough or zero crossing) has occurred. This will be more fully illustrated in the examples.

The use of more than four colors, such as six colors, can add confusion and lose information since the events of interest are occurring at particular instantaneous phases and the transition between colors may not occur at these instantaneous phases. Thus, the discovery of the benefit of using four colors is another particularly beneficial aspect of the present invention.

If desired, the transition between colors can be set at phases other than 0°, 90° and 180°. In some instances, an interpreter may be interested in a phase such as 50°. In such cases, the transition between blue and pink in FIG. 4 could be set at 50° and the other phases changed accordingly. This would enable the interpreter to determine the position of events occurring at 50° phase, 140° phase, etc.

Thus, in general, when using four colors the colors are assigned based on a base angle (BA) as follows with the ranges assigned for FIG. 4 being preferred.

| Color | Range |
| --- | --- |
| one | (BA −90°) to (BA −180°) |
| two | BA to (BA −90°) |
| three | BA to (BA +90°) |
| four | (BA +90°) to (BA +180°) |

7. GENERATE VARIABLE AMPLITUDE/PHASE SEISMIC DISPLAY

Once colors have been assigned to all points to be utilized in the variable amplitude/phase seismic display, the information is sent to a plotter which generates the desired variable amplitude/phase seismic display. Any suitable plotter may be utilized. An example of a suitable plotter is the Applicon plotter.

Any suitable computer program may be utilized to generate the variable amplitude/phase seismic display in accordance with the present invention. A suitable computer program for use with an IBM 3084 computer is set forth in Appendix I. The computer program is self explanatory to one skilled in the use of the IBM 3084 computer.

The following examples are presented in further illustration of the invention.

EXAMPLE I

The plurality of seismic wiggle traces illustrated in FIG. 3 were converted to a variable amplitude/phase seismic display in accordance with the present invention using the colors illustrated in FIG. 4 and using real amplitude. The result is illustrated in FIG. 5.

Figure 5:
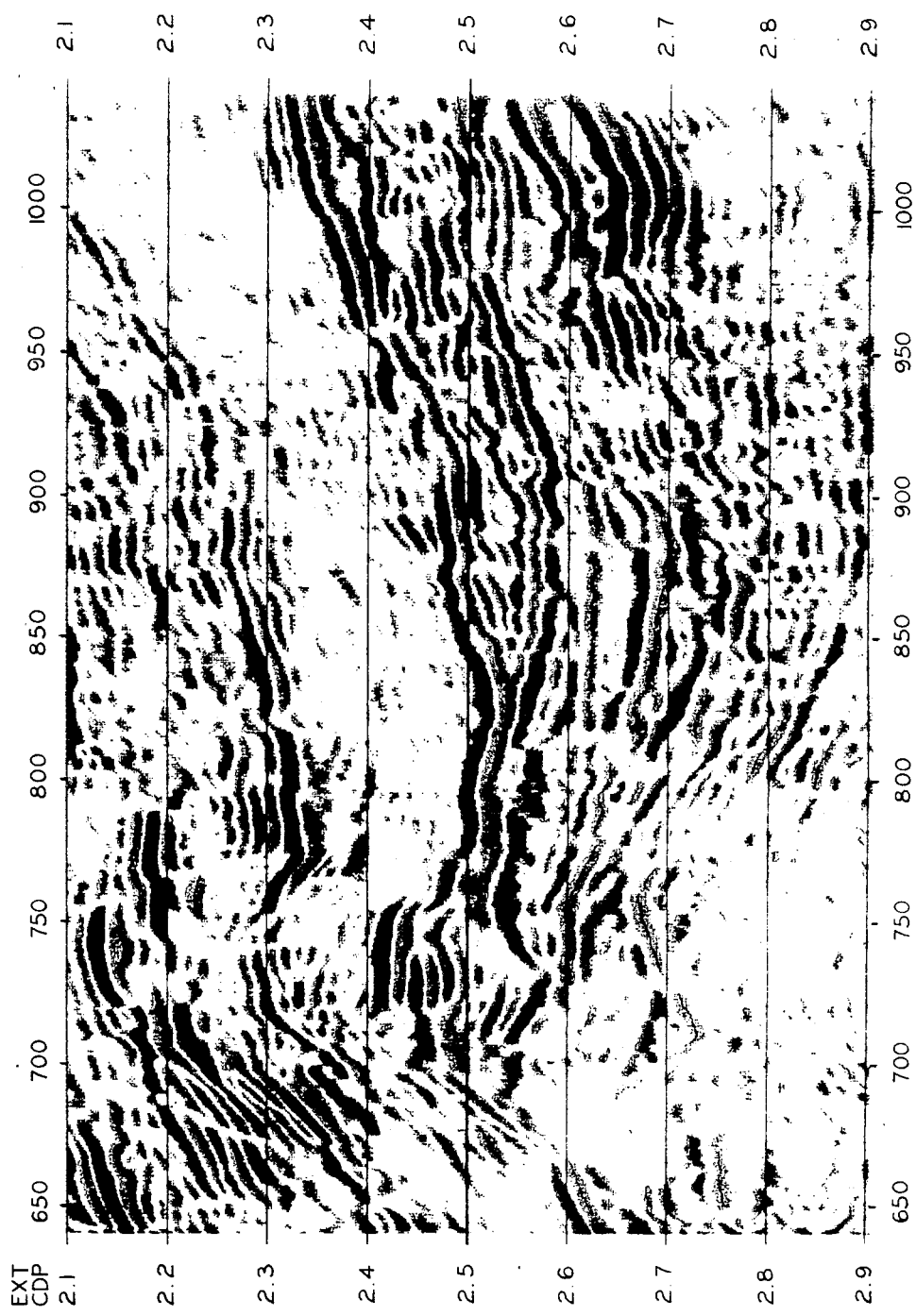
FIG. 5 is an illustration of the seismic wiggle traces of FIG. 3 converted to a variable amplitude/phase seismic display in accordance with the present invention using real amplitude.

Referring now to FIG. 5, it can be seen that peaks, troughs and zero crossings are very well defined. As an example, the very clear transition between blue and pink illustrates the location of peaks. In like manner, the transition between green and blue illustrates zero crossings and the transition between green and orange illustrates troughs.

The high amplitude, which can also be seen from the seismic wiggle traces illustrated in FIG. 3, is illustrated by darker colors in the central portion of FIG. 5.

It is also noted that faults, pinchouts and event correlations are much more easily discovered in FIG. 5. Also, shifts in strong color lines in area of faults indicates the nature and size of the fault. The presence of white lines between colors also provides for easier interpretation.

EXAMPLE II

Figure 6:
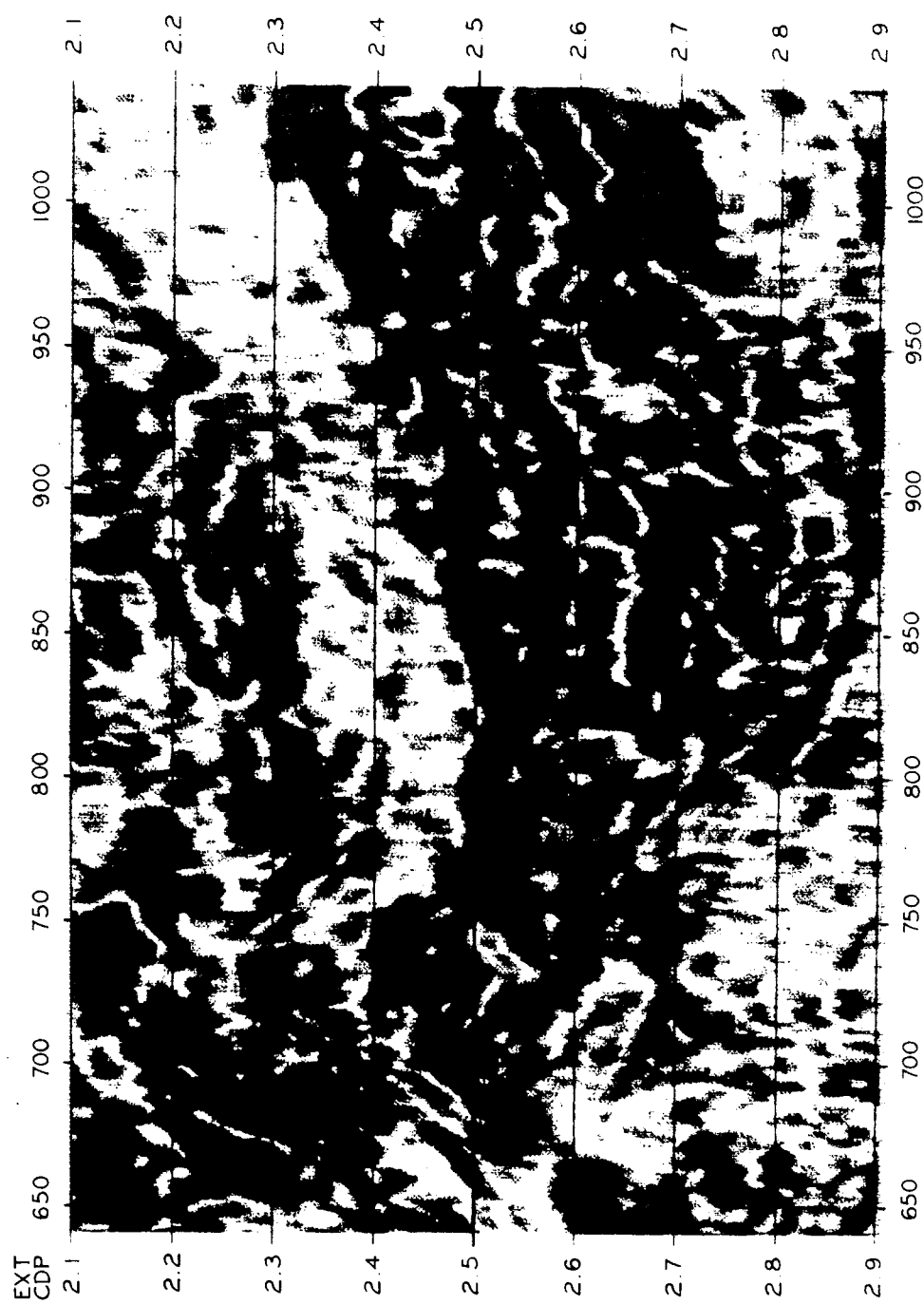
FIG. 6 is an illustration of the seismic wiggle traces of FIG. 3 converted to a variable amplitude/phase seismic display in accordance with the present invention using envelope amplitude.

The plurality of seismic wiggle traces illustrated in FIG. 3 were converted to a variable amplitude/phase seismic display in the same manner as in Example I but envelope amplitude was used instead of real amplitude. The result is illustrated in FIG. 6.

Referring now to FIG. 6, it can again be seen that valuable information is available. However, some information has been lost and it is more difficult to correlate across small faults in FIG. 6 than in FIG. 5. Also, the absence of the white between colors makes interpretation of FIG. 6 more difficult than interpretation of FIG. 5. Finally, the overall appearance of FIG. 6 is less visually pleasing to an interpreter. Thus, the preference for the use of real amplitude.

EXAMPLE III

As has been previously stated, the variable amplitude/phase seismic display can be applied to three-dimensional seismic data. As an example of this, the present invention was applied to a time slice of the area covered by the seismic wiggle traces illustrated in FIG. 3. The result is illustrated in FIG. 7 using the color code of FIG. 4.

Figure 7:
FIG. 7 is an illustration of the variable amplitude/phase seismic display applied to three-dimensional seismic data.
Figure 8:
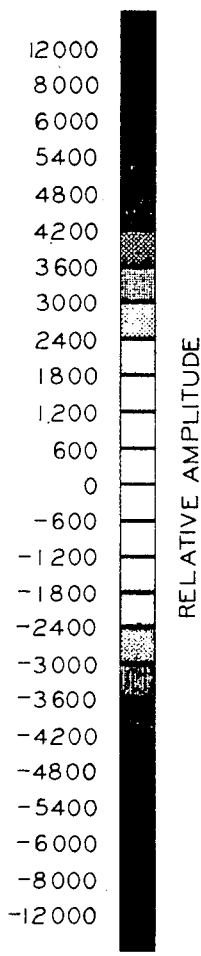
FIG. 8 is an illustration of the color code utilized to generate the seismic display of FIG. 9.

As a comparison, a conventional, color, three-dimensional seismic display based only on amplitude was generated using the same data as utilized to generate the seismic display of FIG. 7 and using the color code illustrated in FIG. 8. This display is illustrated in FIG. 9.

Figure 9:
FIG. 9 is an illustration of a conventional color three-dimensional seismic display based only on amplitude.

A comparison of FIGS. 7 and 9 shows that more seismic information is available to the interpreter in FIG. 7 than in FIG. 9. In particular, the location of peaks, troughs and zero crossings are available from FIG. 7 and are not available from FIG. 9.

EXAMPLE 3

Figure 10:
FIG. 10 is an illustration of the variable amplitude/phase seismic display of FIG. 5 without image enhancement.

The seismic display illustrated in FIG. 5 was generated without interpolation with the result being as illustrated in FIG. 10. The display illustrated in FIG. 10 could be used but the blocky appearance is not visually appealing to an interpreter. Also the clarity of the seismic display of FIG. 5 has been lost of some extent which would increase the difficulty of interpretation.

The invention has been described in terms of a preferred embodiment. Reasonable variations are possible within the scope of the invention. Such reasonable variations are within the scope of the present invention, as claimed.

```
C      *************************************************
C      ******  SOURCE CODE FOR VERTICAL AMPLITUDE-PHASE PLOT *****
C      ******              SPS FORMAT                       *****
C      *************************************************
C
       DIMENSION TARRAY(4096),BUFF(5000),ENV(4096),SLOC1(2),SLOC2(2)
       DIMENSION NUMTRC(3000)
       COMMON /CTRL/NX,NY,NTREC,DELT,NT,TPI,SPI,NREC,SCALE,LINC,ZMAX
       COMMON/PARM/XORGIN,YORGIN,IORGIN,PLOTX,PLOTY,XINC,YINC,SIZE,SIZE1
       COMMON/CTRL2/IFLAG,IXFRST,IXLINE,IP,TAR,IN,NN,IPLTE
       COMMON/CTRL3/IOP,IOPT1,IOPT2,IOPT3,IOPT4,IOPT5
       COMMON/CTRL4/ICDPS,ICDPE,ITST,ITED,NSAMP,ICDPN
C
       INTEGER*4 JBUFF(5000),MLINE(3),ICDPON,INKSON,IBLANK
       INTEGER*4 IDIR,IDIRR,IDIRL,DDNAME(2),ILOC(2),ILOC2(2)
       INTEGER*2 IBUFF(10000),ITRHE,IHEAD,IPCODE,IVOL(3),IPROS(4)
       EQUIVALENCE (BUFF(1),IBUFF(1),JBUFF(1))
       EQUIVALENCE (ILOC(1),SLOC1(1)),(ILOC2(1),SLOC2(1))
C
       DATA IDIR/'    '/,IDIRR/'RTOL'/,IDIRL/'LTOR'/
       DATA INKSON/'    '/,ICDPON/'    '/,IBLANK/'    '/
       DATA IHEAD/'TP'/
       DATA ITRHE/'HE'/
       DATA IPCODE/'  '/
       DATA DDNAME/'FT29','F001'/
C
       WRITE(6,1075)
C      *************************************************
C      ********  CHECK TIME OF DAY AND SET INTERVAL TIMER  ********
C      *************************************************
       CALL TIMINT(KK)
       CALL TIME(SLOC1)
C
       NX=0
       READ(10,1000) TPI,SPI,ICDPS,ICDPE,ITST,ITED,IPCODE
       READ(10,1010) IDIR,ICDPON,INKSON,ZMAX
       WRITE(6,1080)
       WRITE(6,1055) TPI,SPI,ICDPS,ICDPE,ITST,ITED,IDIR,IPCODE
C
       IF(ZMAX.GT.0.0) IOPT1=1
       IF(INKSON.NE.IBLANK) IOPT2=1
       IF(ICDPON.NE.IBLANK) IOPT3=1
       IF(IDIR.EQ.IDIRR) IOPT4=1
C
       LN=0
   20  CALL TAPEIO('TAPEIN  ',BUFF,LN,'R')
       IF(LN.LT.-1) GO TO 20
       IF(LN.EQ.-1) GO TO 400
       IF(IBUFF(1).NE.IHEAD) GO TO 100
       IPROS(1)=IBUFF(5)
       IPROS(2)=IBUFF(6)
       IPROS(3)=IBUFF(7)
       IPROS(4)=IBUFF(8)
```

```
      MLINE(1)=JBUFF(5)
      MLINE(2)=JBUFF(6)
      MLINE(3)=JBUFF(7)
      IRUN=IBUFF(39)
      WRITE(6,1050) IPROS,MLINE,IRUN
      WRITE(6,1060)
      NT=IBUFF(128)
      LT=1024
      IF(NT.GT.1024.AND.NT.LE.2048) LT=2048
      IF(NT.GT.2048.AND.NT.LE.4096) LT=4096
      IDELT=IBUFF(127)
      NREC=IBUFF(164)
      DELT=IDELT
      NREC=ICDPE-ICDPS+1
      CALL LIMIT
C
  100 IF(IBUFF(1).NE.ITRHE) GO TO 200
C
      DO 50 J=1,4096
   50 TARRAY(J)=0.0
C
      ICDPN=IBUFF(63)
      IF(NX.EQ.NREC) GO TO 400
      IF(IBUFF(6).NE.IPCODE) GO TO 200
      IF(ICDPN.LT.ICDPS.OR.ICDPN.GT.ICDPE) GO TO 200
      IF(IBUFF(6).EQ.IPCODE) NX=NX+1
      NTRMP=IBUFF(28)
      IART=IBUFF(4)
C
C     WRITE(6,9998)
C
      DO 250 J=1,NTRMP
       N=IART+J
       TARRAY(J)=BUFF(N)
  250 CONTINUE
      CALL ENVELP(TARRAY,LT,ENV)
      I=ITST
      K=ITED
      WRITE(9) (TARRAY(N),N=I,K)
      WRITE(8) (ENV(N),N=I,K)
      NUMTRC(NX)=ICDPN
      WRITE(6,3004) ICDPN,NTRMP
  200 LN=0
      GO TO 20
C     *******************************************
C     *           PLOT THE SECTION              *
C     *******************************************
  400 WRITE(6,1065)
      CALL IPARM(IERROR)
      IF(IERROR.EQ.1) GO TO 5000
      IF(IOPT4.EQ.1) XORGIN=830
      CALL IPAGB
      CALL IPRINT(1)
      CALL ISTART(IORGIN)
      CALL ICHCOL(1)
      CALL APPLE
      CALL TGRID(NUMTRC)
      CALL TITLE
```

```
      WRITE(6,2040)
      CALL ICLB(0)
C
C     ********** CHECK TIMERS ***********
C
      CALL TIMINT(JJ)
      CALL TIME(SLOC2)
      INTIME=KK-JJ
      WRITE(6,1085) ILOC,ILOC2,INTIME
C
C     ******* RETRIEVE VOLSER ********
C
      CALL DDCK(DDNAME,IFG,IVOL,IDEN)
      WRITE(6,1095) IVOL
C
      WRITE(6,1090)
      STOP
 5000 WRITE(6,2000)
      STOP
 1000 FORMAT(10X,2F10.3,4I5,3X,A2)
 1010 FORMAT(16X,A4,6X,A4,6X,A4,F10.2)
 1050 FORMAT(40X,'FEATURE',3X,4A2,/40X,'LINE',10X,3A4,/,40X,'RUN #',5X,I
     *2,///)
 1055 FORMAT(40X,'TPI',F11.3,/,40X,'IPS',F11.3,/,40X,'FIRST CDP',I5,/,40
     *X,'LAST CDP ',I5,/,40X,'START TIME',I4,/,40X,'END TIME  ',I4,/,40X
     *,'PLOT DIR  ',A4,/,40X,'PC CODE   ',A2)
 1060 FORMAT(///,35X,' *** TRACES PROCESSED ***',///)
 1065 FORMAT(///,35X,' *** TRACE PROCESSING COMPLETED ***',//////)
 1075 FORMAT(1H1,///,100('*'),/////,35X,'THIS IS THE VARIABLE AMPLITUDE
     *PLOTTING PACKAGE FOR SPS',////,35X,'FOR PROBLEMS CALL CLIFF SHOCK
     *AT X-4559',/////////)
 1080 FORMAT(35X,' *** INPUT PARAMETERS *****',///)
 1085 FORMAT(//,35X,' START TIME     ',2A4,//,36X,'END TIME       ',2A4,
     *//,36X,'CPU IN SECONDS',I10,//)
 1090 FORMAT(//////////,35X,' ********* THIS IS END OF JOB *********')
 1095 FORMAT(35X,' OUTPUT VOLUME    ** ',3A2,'  FILE #2  **')
 2000 FORMAT(35X,'###### PROGRAM TERMINATED DUE TO CRITICAL ERROR ####')
 2040 FORMAT(35X,' ****  OUTPUT INFORMATION  ****',/////)
 3004 FORMAT(25X,'**** CDP',I4,' WITH ',I4,' SAMPLES IS SUCCESSFULLY PRO
     *CESSED *****')
      STOP
      END
      SUBROUTINE APPLE
      COMMON /CTRL/NX,NY,NTREC,DELT,NT,TPI,SPI,NREC,SCALE,LINC,ZMAX
      COMMON /PARM/XORGIN,YORGIN,IORGIN,PLOTX,PLOTY,XINC,YINC,SIZE,SIZE1
      COMMON /CTRL3/IOP,IOPT1,IOPT2,IOPT3,IOPT4,IOPT5
      COMMON/CTRL4/ICDPS,ICDPE,ITST,ITED,NSAMP,ICDPN
C
      DIMENSION SBUFF(3000),TBUFF(3000),PBUFF(3000),ABUFF(3000)
      DIMENSION U(4),AIN(100000),ZCLASS(16),PIN(100000),IBUFF(3000)
      DIMENSION ISET(64),PCLASS(5)
      DATA PCLASS/-3.1459,-1.57,0.0,1.57,3.1459/
C
      DATA ISET/10001,20002,30003,40004,50005,60006,70007,80008,90009,10
     *0010,110011,120012,130013,140014,150015,160016,1,2,3,4,5,6,7,8,9,1
     *0,11,12,13,14,15,16,100,200,300,400,500,600,700,800,900,1000,1100,
     *1200,1300,1400,1500,1600,10100,20200,30300,40400,50500,60600,70700
```

```
      *,80800,90900,101000,111100,121200,131300,141400,151500,161600/
C
      DATA ZCLASS/0.0,400.,800.,1200.,1600.,2000.,2400.,2800.,3200.,3600
      *.,4000.,4400.,4800.,5200.,5600.,6000./
C
      IF(IOPT1.EQ.1) CALL NEWSCL(ZCLASS,ZMAX)
      NSIGN=1
      IF(IOPT4.EQ.1) NSIGN=-1
      NCLZ=16
      NCLZ1=NCLZ-1
      REWIND 8
      REWIND 9
C     ***************************************
C     ******* SET PLOTTING COORDINATES ********
C     ***************************************
      XSTART=YORGIN
      YST=XORGIN
C     ***************************************
C     ******* BEGIN INTERPOLATION SCHEME  *******
C     ***************************************
C
      XPIX=PLOTY/.20+1.5
      NPIXX=IFIX(XPIX)
      U(1)=1.
      U(3)=.5
      NPTS=NSAMP+1
C
      NSAVE=0
      NPASS=0
      NINT=100000/NPIXX
   10 LNT=NINT
      U(2)=1./((XPIX-1.5)/(NSAMP-1))
      U(4)=FLOAT(NPIXX)
      NROW=0
      NPTS=NSAMP+1
      IF(LNT.GT.(NX-NSAVE))LNT=NX-NSAVE
C     ***************************************
C     ******* T DIRECTION INTERPOLATION  *******
C     ***************************************
      DO 40 I=1,LNT
        NSAVE=NSAVE+1
        NROW=NROW+1
        READ(8) (PBUFF(K),K=1,NSAMP)
        READ(9) (ABUFF(K),K=1,NSAMP)
        PBUFF(NPTS)=PBUFF(NSAMP)
        ABUFF(NPTS)=ABUFF(NSAMP)
        CALL UNWRAP(PBUFF,NPTS)
        CALL APAM('QIN*',1,TBUFF,NPIXX,4,0,PBUFF,NPTS,4,0,U,4,4,0)
        CALL APAM('QIN*',1,SBUFF,NPIXX,4,0,ABUFF,NPTS,4,0,U,4,4,0)
        CALL WRAP(TBUFF,NPIXX)
        DO 30 J=1,NPIXX
          N=(NROW-1)*NPIXX+J
          PIN(N)=TBUFF(J)
          AIN(N)=SBUFF(J)
   30   CONTINUE
C     ***************************************
C     ******* CHECK FOR FINISHED T DIRECTION  *******
```

```
C     ****************************************************
   40 CONTINUE
C     ****************************************************
C     ******  BEGIN X DIRECTION INTERPOLATION  ********
C     ****************************************************
      YPIX=(NROW-1)*XINC
      YPIX=YPIX/.2+1.5
      NPIXY=IFIX(YPIX)
      U(2)=1./((YPIX-1.5)/(NROW-1))
      U(4)=FLOAT(NPIXY)
      NPTS=NROW+1
C     ****************************************************
C     ******   START X INTERPOLATION LOOP   *******
C     ****************************************************
      DO 200 J=1,NPIXX
      DO 100 I=1,NROW
        SBUFF(I)=AIN(J+(I-1)*NPIXX)
        TBUFF(I)=PIN(J+(I-1)*NPIXX)
  100 CONTINUE
C
      SBUFF(NPTS)=SBUFF(NROW)
      TBUFF(NPTS)=TBUFF(NROW)
C
      CALL UNWRAP(TBUFF,NPTS)
      CALL APAM('QIN*',1,PBUFF,NPIXY,4,0,TBUFF,NPTS,4,0,U,4,4,0)
      CALL APAM('QIN*',1,ABUFF,NPIXY,4,0,SBUFF,NPTS,4,0,U,4,4,0)
      CALL WRAP(PBUFF,NPIXY)
C     ****************************************************
C     *******  BEGIN PLOTTING X SCAN LINES  *******
C     ****************************************************
      XB=XSTART-(J-1)*.2
      DO 51 KT=1,NPIXY
        A=PBUFF(KT)
        B=ABS(ABUFF(KT))
        IF(A.LT.PCLASS(1)) II=1
        IF(A.GT.PCLASS(5)) II=4
        DO 59 I=1,4
        IF(A.GT.PCLASS(I).AND.A.LE.PCLASS(I+1)) II=I
   59 CONTINUE
      IF(B.GT.ZCLASS(NCLZ)) ICODE=ISET((II-1)*16+16)
      IF(B.LT.ZCLASS(1)) ICODE=ISET((II-1)*16+1)
      DO 31 M=1,NCLZ1
      IF(B.GT.ZCLASS(M).AND.B.LE.ZCLASS(M+1)) ICODE=ISET((II-1)*16+M)
   31 CONTINUE
        IF(B.EQ.0.0) ICODE=0
        IBUFF(KT)=ICODE
        IF(ICODE.EQ.0) KOUNT=KOUNT+1
   51 CONTINUE
C
      DO 71 KT=1,NPIXY
      YB=YST+(KT-1)*.2*NSIGN
      YSIDE=.2
      CALL IRECT(YB,XB,YSIDE,.20,IBUFF(KT),0)
   71 CONTINUE
  200 CONTINUE
C     ****************************************************
C     ******  CHECK TO SEE IF ENTIRE TIME SLICE  *******
C     ******              IS FINISHED             *******
```

```
C      *********************************************************
       NPASS=NPASS+1
       IF(NSAVE.GE.NX) GO TO 700
       YST=YST+NPIXY*.2*NSIGN
       BACKSPACE 8
       BACKSPACE 9
       NSAVE=NSAVE-1
       GO TO 10
C      *********************************************************
C      ******* PLOTTING IS DONE, CLOSE PLOTTING FILE  *******
C      *********************************************************
  700  CONTINUE
       XSTART=XORGIN+PLOTX+25.
       IF(IOPT4.EQ.1) XSTART=XORGIN-PLOTX-110.
       IF(IOPT2.NE.1) CALL INKS(XSTART,ISET,PCLASS,ZCLASS)
       RETURN
       END
C
C
       SUBROUTINE UNWRAP(SBUFF,K)
       DIMENSION SBUFF(1),WRAPN(8000)
       PI=3.14159
       TWOPI=2.*PI
       NPTS=K+1
       WRAPN(1)=0.0
C
       DO 100 I=1,K
         DIFF=SBUFF(I)-SBUFF(I+1)
         WRAPN(I+1)=WRAPN(I)
         IF(DIFF.GT.PI) WRAPN(I+1)=WRAPN(I)+1
         IF(DIFF.LT.(-PI)) WRAPN(I+1)=WRAPN(I)-1
  100  CONTINUE
C
       DO 200 J=2,NPTS
         SBUFF(J)=SBUFF(J)+WRAPN(J)*TWOPI
  200  CONTINUE
       RETURN
       END
       SUBROUTINE WRAP(TBUFF,K)
       DIMENSION TBUFF(1)
       PI=3.14159
       TWOPI=2*3.14159
       DO 100 I=1,K
         TBUFF(I)=AMOD(TBUFF(I),TWOPI)
         IF(TBUFF(I).LT.(-PI)) TBUFF(I)=TBUFF(I)+TWOPI
         IF(TBUFF(I).GT.PI) TBUFF(I)=TBUFF(I)-TWOPI
  100  CONTINUE
       RETURN
       END
       SUBROUTINE INKS(XSTART,ISET,PCLASS,ZCLASS)
       DIMENSION ISET(1),PCLASS(1),ZCLASS(1)
       XSTART=XSTART+20.
       DO 200 I=1,4
         X=XSTART+(I-1)*10.
         DO 100 J=1,16
           Y=50.+(J-1)*10.
           CALL IRECT(X,Y,10.,10.,ISET((I-1)*16+J),1)
```

```
  100 CONTINUE
  200 CONTINUE
      X1=XSTART-10.
      DO 150 J=1,16
       Y=50.+(J-1)*10.
       CALL INUMB(ZCLASS(J),X1,Y,2.,0,7,0)
  150 CONTINUE
      Y=50.-5.
      DO 300 J=1,5
       X=XSTART+(J-1)*10.
       Z=PCLASS(J)*57.35
       CALL INUMB(Z,X,Y,2.,270,7,0)
  300 CONTINUE
      X=XSTART+10.
      Y=50.-18.
      CALL ITEXT('PHASE¬ ',X,Y,4.0,0,7)
      X=XSTART+50.
      Y=50.+60.
      CALL ITEXT('AMPLITUDE¬ ',X,Y,4.0,90,7)
C
      CALL LEGEND(XSTART,ISET,PCLASS,ZCLASS)
C
      RETURN
      END
      SUBROUTINE LEGEND(XSTART,ISET,PCLASS,ZCLASS)
      DIMENSION TARRAY(1024),ENV(1024),PCLASS(1),ZCLASS(1),ISET(1)
      DIMENSION YP(180),XP(180)
      INTEGER*2 JDATE(6),IDATE(4)
      DATA JDATE/'  ',' /',' ',' /',' ','¬ '/
C
C *******************************************
C *   ROUTINE TO BUILD TRACE LEGEND     *
C *******************************************
C
      CALL DATE(IDATE)
      JDATE(1)=IDATE(1)
      JDATE(3)=IDATE(2)
      JDATE(5)=IDATE(3)
C
      C=ZCLASS(16)
      D=ZCLASS(16)-ZCLASS(15)
C
      LT=1024
C
      DO 100 J=1,720
       ANGLE=J/180.*3.14159
       TARRAY(J)=SIN(ANGLE)
  100 CONTINUE
C
      DO 200 J=1,360
       TARRAY(J)=TARRAY(J)*(C+D*2)
  200 CONTINUE
C
      DO 300 J=361,540
       TARRAY(J)=TARRAY(J)*(C-D*3)
  300 CONTINUE
C
      DO 400 J=541,720
```

```
          TARRAY(J)=TARRAY(J)*(C-D*9)
  400 CONTINUE
C
      DO 450 J=1,90
        ENV(J)=J-90.
        ENV(J+90)=J
        ENV(J+180)=90.+J
        ENV(J+270)=J-180.
        ENV(J+360)=J-90.
        ENV(J+450)=J
        ENV(J+540)=90.+J
        ENV(J+630)=J-180.
  450 CONTINUE
C
      DO 475 J=1,720
         ENV(J)=ENV(J)/180.*3.14159
  475 CONTINUE
C
      X1=XSTART+10.
      Y=256.
      KOUNT=0
C
      DO 502 J=1,720,4
        A=ENV(J)
        B=ABS(TARRAY(J))
        IF(A.LT.PCLASS(1)) II=1
        IF(A.GT.PCLASS(5)) II=4
        DO 501 I=1,4
          IF(A.GT.PCLASS(I).AND.A.LE.PCLASS(I+1)) II=I
  501 CONTINUE
C
C
      IF(B.GT.ZCLASS(16)) ICODE=ISET((II-1)*16+16)
      IF(B.LT.ZCLASS(1)) ICODE=ISET((II-1)*16+1)
C
      DO 503 K=1,15
         IF(B.GT.ZCLASS(K).AND.B.LT.ZCLASS(K+1)) ICODE=ISET((II-1)*16+K)
  503 CONTINUE
C
      KOUNT=KOUNT+1
      Y1=Y-(KOUNT-1)*.2
      CALL IRECT(X1,Y1,20.,.2,ICODE,0)
  502 CONTINUE
C
      X1=XSTART+20.
      KOUNT=0
C
      DO 600 I=1,720,4
        KOUNT=KOUNT+1
        YP(KOUNT)=Y-(KOUNT-1)*.2
        XP(KOUNT)=TARRAY(I)/(C+D*2)*9.+X1
  600 CONTINUE
C
      CALL ILINEC(XP,YP,KOUNT,7)
      CALL ILINE(X1, 56.,.2,7,1)
      CALL ILINE(X1,220.,.2,7,0)
      X1=XSTART+30.
      CALL ITEXT('+¬ ',X1,258.,2.,0,7)
```

```
      X1=XSTART+10.
      CALL ITEXT('-¬ ',X1,258.,2.,0,7)
      X1=XSTART+20.
      CALL ITEXT('0¬ ',X1,258.,2.,0,7)
C
      X1=XSTART+10.
      CALL ITEXT(JDATE,X1,280.,2.,0,7)
      X1=XSTART-15.
      CALL ITEXT('PHASE VARIABLE AMPLITUDE¬ ',X1,270.,3.,0,7)
C
      RETURN
      END
      SUBROUTINE TGRID(NUMTRC)
      COMMON /CTRL/NX,NY,NTREC,DELT,NT,TPI,SPI,NREC,SCALE,LINC,ZMAX
      COMMON /PARM/XORGIN,YORGIN,IORGIN,PLOTX,PLOTY,XINC,YINC,SIZE,SIZE1
      COMMON /CTRL3/ IOP,IOPT1,IOPT2,IOPT3,IOPT4,IOPT5
      COMMON /CTRL4/ICDPS,ICDPE,ITST,ITED,NSAMP,ICDPN
C
      DIMENSION TLINE(81),TNUMB(81),NUMTRC(1)
      INTEGER*2 LABEL(3),ICODE,IEXT(5),IEND,IEX
      DATA IEXT/' ',' ',' ',' ','¬ '/
      DATA TLINE/81*.2/,TNUMB/81*1.4/,LABEL/' ',' ','¬ '/
      DATA IEX/'EX'/,IEND/'EF'/
      NSIGN=1
      IF(IOPT4.EQ.1) NSIGN=-1
C
C     *******   SET PLOT PARAMETERS   ******
C
      WRITE(6,2010)
C
      X1=XORGIN-(2.*NSIGN)
      X2=XORGIN+(PLOTX+2.)*NSIGN
      XI1=XORGIN-(10.*NSIGN)
      XI2=XORGIN+(PLOTX+10)*NSIGN
C
C     *******   BUILD REFRENCE TABLES ******
C
      DO 100 J=1,81,10
         TNUMB(J)=2.0
         TLINE(J)=.6
  100 CONTINUE
C
      DO 200 J=6,81,10
         TNUMB(J)=2.0
         TLINE(J)=.4
  200 CONTINUE
C
C     ******  INITIALIZE LOOPS   ********
C
      M=(ITST-1)*DELT+100
      IF(ITST.EQ.0) M=(ITST-1)*DELT+100
      K=ITED*DELT+100
      I=0
      T=SPI/10.*25.4
C
C     ********   PLOT TIMING LINES  *******
C
      DO 300 J=M,K,100
```

```
      I=I+1
      VALUE=(J-100.)/1000.
      ILOC=J/100
      Y=YORGIN-(I-1)*T
      Y1=Y-.5
C
      CALL ILINE(X1,Y,TLINE(ILOC),7,1)
      CALL ILINE(X2,Y,TLINE(ILOC),7,0)
C
      CALL INUMB(VALUE,XI1,Y1,TNUMB(ILOC),0,7,1)
      CALL INUMB(VALUE,XI2,Y1,TNUMB(ILOC),0,7,1)
C
  300 CONTINUE
C
C     ********   PLOT ANNOTATION   **********
C
      READ(10,1000) IFTRC,ITINC,ITLABL,ITLINC
C
      NTRC=NX
      DO 325 K=1,NX
         IF(IFTRC.EQ.NUMTRC(K)) I=K
         IF(ITLABL.EQ.NUMTRC(K)) J=K
  325 CONTINUE
      NTRCI=I+NTRC
      NTRCJ=J+NTRC
      YT=YORGIN+1.
      YT1=YORGIN+2.
      YT2=YORGIN
      YT3=YT1+1.
      YT4=YT1+4.
      YB=YORGIN-PLOTY-1.
      YB1=YORGIN-PLOTY-2.
      YB2=YORGIN-PLOTY
      YB3=YB1-3.
C
      X=XORGIN-12.*NSIGN
      IF(IOPT3.NE.1) CALL ITEXT('CDP¬ ',X,YT3,2.,0,7)
      CALL ITEXT('EXT¬ ',X,YT4,2.,0,6)
C
      DO 350 K=1,NTRC
         X=XORGIN+(K-1)*XINC*NSIGN
         CALL ILINE(X,YT,.2,4,1)
         CALL ILINE(X,YT2,.2,4,0)
         CALL ILINE(X,YB,.2,4,1)
         CALL ILINE(X,YB2,.2,4,0)
  350 CONTINUE
C
      L=0
      DO 400 K=I,NTRC,ITINC
      L=L+1
      L1=(L-1)*ITINC
         X=XORGIN+L1*XINC*NSIGN+(I-1)*XINC*NSIGN
         CALL ILINE(X,YT1,.4,3,1)
         CALL ILINE(X,YT2,.4,3,0)
         CALL ILINE(X,YB1,.4,3,1)
         CALL ILINE(X,YB2,.4,3,0)
  400 CONTINUE
```

```
C
      IF(IOPT3.EQ.1) GO TO 10
      IF(ITLABL.LE.0)GO TO 10
      IF(ITLINC.LE.0)GO TO 10
      JN=0
      DO 500 K=J,NTRC,ITLINC
         JN=JN+1
         J1=(JN-1)*ITLINC
         X=XORGIN+J1*XINC*NSIGN+(J-1)*XINC*NSIGN-2.
         VALUE=NUMTRC(K)
         CALL INUMB(VALUE,X,YT3,2.,0,7,0)
         CALL INUMB(VALUE,X,YB3,2.,0,7,0)
  500 CONTINUE
C
C     ********* PLOT USER'S EXTERNAL ANNOTATION  *****
C
   10 READ(10,2000) ICODE,INTR,(IEXT(K),K=1,4)
      IF(ICODE.EQ.IEND) GO TO 600
      IF(INTR.LT.ICDPS.OR.INTR.GT.ICDPE) GO TO 10
      DO 550 K=1,NX
      IF(INTR.EQ.NUMTRC(K)) INCR=K-1
  550 CONTINUE
      X=XORGIN+INCR*XINC*NSIGN-8.
      WRITE(6,2020) ICODE,INTR,(IEXT(K),K=1,4)
      CALL ITEXT(IEXT,X,YT4,2.,0,6)
      GO TO 10
  600 WRITE(6,2030)
      RETURN
 1000 FORMAT(10X,4I10)
 2000 FORMAT(A2,I5,2X,4A2)
 2010 FORMAT(35X,'***   USER TRACE ANNOTATION   ***',///,25X,'ANNOTATION T
     *YPE',5X,'INTERNAL CDP',5X,'ANNOTATION',//)
 2020 FORMAT(31X,A2,17X,I5,9X,4A2)
 2030 FORMAT(//,35X,'***  USER TRACE ANNOTATION COMPLETED  ***',//)
      END
      SUBROUTINE IPARM(IERROR)
      COMMON /CTRL/NX,NY,NTREC,DELT,NT,TPI,SPI,NREC,SCALE,LINC,ZMAX
      COMMON /PARM/XORGIN,YORGIN,IORGIN,PLOTX,PLOTY,XINC,YINC,SIZE,SIZE1
      COMMON /CTRL4/ICDPS,ICDPE,ITST,ITED,NSAMP,ICDPN
C
      IERROR=0
      PLOTX=NX/TPI*25.4
      TIMEL=DELT*NSAMP/1000.
      PLOTY=TIMEL*25.4*SPI
C
      IF(PLOTX.GT.715.) GO TO 50
      IF(PLOTY.GT.519.) GO TO 60
C
      IORGIN=2
   30 CONTINUE
      YORGIN=529.
      XORGIN=25.
      XINC=25.4/TPI
      SIZE=XINC/2.
      SIZE1=XINC
      YINC=(SPI*25.4)/(NSAMP/TIMEL)
      RETURN
   50 WRITE(6,1000) L1,TPI,PLOTX
```

```
      IERROR=1
 1000 FORMAT(10X,'$$$$$$$$$ ERROR   YOUR REQUESTED PLOT IS TOO LARGE
     * THE NUMBER OF TRACES TO PROCESS  ',I10,5X,' TPI  ',F6.3,10X,'TOTA
     * L LENGTH IS ',F7.2,' MM  YOUR LIMIT IS 715 MM $$$$$$')
      RETURN
   60 WRITE(6,1010) L1,SPI,PLOTY
      IERROR=1
 1010 FORMAT(10X,'$$$$$$$$$ ERROR   YOUR REQUESTED PLOT IS TOO LARGE
     * THE NUMBER OF TRACES TO PROCESS  ',I10,5X,' IPS  ',F6.3,10X,'TOTA
     * L LENGTH IS ',F7.2,' MM  YOUR LIMIT IS 519 MM $$$$$$')
      RETURN
      END
      SUBROUTINE NEWSCL(ZCLASS,ZMAX)
      DIMENSION ZCLASS(1)
      INT=ZMAX/15.
      DO 100 I=1,16
        ZCLASS(I)=(I-1)*INT
  100 CONTINUE
      RETURN
      END
      SUBROUTINE ENVELP(PUT,LT,ENV)
      REAL  RST(4096), CST(4096), ENV(4096), PUT(4096)
C     RST HOLDS THE REAL PART OF THE SEISMIC TRACE
C     CST HOLDS THE IMAGINARY (CONJAGATE) PART OF THE TRACE

COMPLEX TRACE(4096)
      B=0.0
      DO 10 J=1,LT
      ENV(J)=0.0
      TRACE(J)=CMPLX(0.0,0.0)
      TRACE(J)=CMPLX(PUT(J),B)
   10 CONTINUE

LH=LT/2
      LH1=LH+1

CALL FFT(LT,TRACE,-1.0)

DO 20 I=1,LT
      RST(I)=REAL(TRACE(I))
      CST(I)=AIMAG(TRACE(I))
   20 CONTINUE

DO 30 I=2,LH
      RST(I)=2.0*RST(I)
      CST(I)=2.0*CST(I)
   30 CONTINUE

DO 40 I=LH1,LT
      RST(I)=0.0
      CST(I)=0.0
   40 CONTINUE
      DO 45 I=1,LT
      TRACE(I)=CMPLX(RST(I),CST(I))
   45 CONTINUE

CALL FFT(LT,TRACE,1.0)
```

```
      DO 47 I=1,LT
      RST(I)=REAL(TRACE(I))
      CST(I)=AIMAG(TRACE(I))
   47 CONTINUE
C
C     ***************************************************
C     *         CALCULATE PHASE VALUES                  *
C     ***************************************************
C
      DO 50 I=1,LT
      IF(RST(I).EQ.0.AND.CST(I).EQ.0) GO TO 55
      ENV(I)=ATAN2(CST(I),RST(I))
   55 IF(RST(I).EQ.0.AND.CST(I).EQ.0) ENV(I)=0.0
   50 CONTINUE
C
C     DO 65 I=1,LT
C     WRITE(6,60)  RST(I), CST(I), ENV(I),PUT(I)
C  65 CONTINUE
C  60 FORMAT(10X,4F10.3)
      RETURN
      END
      SUBROUTINE FFT(LX,CX,SIGNI)
C     LX=NUMBER OF SAMPLE POINTS-MUST BE A POWER OF 2
C     CX=INPUT AND OUTPUT DATA
C     SIGNI=+1 FOR INVERSE TRANSFORM
C     SIGNI=-1 FOR FORWARD TRANSFORM
C     SIGNI IS DESIGNATED IN MAIN PROGRAM
      COMPLEX CX(LX), CARG, CEXP, CW, CTEMP
      J=1
      SC=1./FLOAT(LX)
      DO 30 I=1,LX
      IF(I.GT.J) GO TO 10
      CTEMP=CX(J)
      CX(J)=CX(I)
      CX(I)=CTEMP
   10 M=LX/2
   20 IF(J.LE.M) GO TO 30
      J=J-M
      M=M/2
      IF(M.GE.1) GO TO 20
   30 J=J+M
      L=1
   40 ISTEP=2*L
      DO 50 M=1,L
      CARG=(0.,1.)*(3.14159265*SIGNI*FLOAT(M-1))/FLOAT(L)
      CW=CEXP(CARG)
      DO 50 I=M,LX,ISTEP
      CTEMP=CW*CX(I+L)
      CX(I+L)=CX(I)-CTEMP
   50 CX(I)=CX(I)+CTEMP
      L=ISTEP
      IF(L.LT.LX) GO TO 40
      IF(SIGNI.LT.0.0) RETURN
      DO 60 I=1,LX
   60 CX(I)=CX(I)*SC
      RETURN
      END
      SUBROUTINE LIMIT
```

```
      COMMON/CTRL/NX,NY,NTREC,DELT,NT,TPI,SPI,NREC,SCALE,LINC,ZMAX
      COMMON/CTRL4/ICDPS,ICDPE,ITST,ITED,NSAMP,ICDPN
C
C
      ITST=ITST/DELT+1
      IF(ITST.EQ.0) ITST=1
      ITED=ITED/DELT+1
      IF(ITED.EQ.0) ITED=NT
      NSAMP=ITED-ITST+1
C     WRITE(6,1000) ICDPS,ICDPE,ITST,ITED,NSAMP
C1000 FORMAT(//,5I10)
      RETURN
      END
      SUBROUTINE TITLE
      COMMON /PARM/XORGIN,YORGIN,IORGIN,PLOTX,PLOTY,XINC,YINC,SIZE,SIZE1
      COMMON /CTRL3/IOP,IOPT1,IOPT2,IOPT3,IOPT4,IOPT5
      INTEGER*2 INOTE(3),ICHK,ISAVE(39),IEND
      DATA ICHK/'  '/,IEND/'¬ '/
C
C
C     ****** PLOT LINE TITLE *****
C
C
C
C
      XSHIFT=XORGIN+PLOTX+20.
      IF(IOPT4.EQ.1) XSHIFT=XORGIN-PLOTX-110.
      YSHIFT=534.
C
      WRITE(6,1040)
C
   10 JCNT=0
      ICNT=0
C
C     ********** READ USER'S LABEL ************
C
      READ(10,1000) ISIZE,(ISAVE(K),K=1,39)
        IF(ISIZE.EQ.0) GO TO 200
C
C     ********** FIND THE END OF TEXT ***********
C
      DO 100 J=1,39
        IF(ISAVE(J).EQ.ICHK) ICNT=ICNT+1
        IF(ISAVE(J).NE.ICHK) JCNT=JCNT+1
        IF(ISAVE(J).NE.ICHK) ICNT=0
  100 CONTINUE
C
      IADJ=39-ICNT
      ICNT=IADJ*2
      NCHR=110/ISIZE
C
C     ********** PRINT THE USER'S INPUT **********
C
      WRITE(6,1030) ISIZE,ISAVE
C
      IF(ICNT.GT.NCHR) GO TO 300
      ISAVE(IADJ+1)=IEND
      YSHIFT=YSHIFT-2.-ISIZE
```

```
      SIZE=ISIZE
      IF(IOPT2.EQ.0.AND.YSHIFT.LT.300.) GO TO 900
      IF(IOPT2.EQ.1.AND.YSHIFT.LT.25.) GO TO 900
      CALL ITEXT(ISAVE,XSHIFT,YSHIFT,SIZE,0,7)
      GO TO 10
C
  200 WRITE(6,1010)
      RETURN
  800 WRITE(6,1020)
      RETURN
  900 WRITE(6,1050)
      RETURN
C
 1000 FORMAT(I1,1X,39A2)
 1010 FORMAT(//,35X,'***  SIDE LABEL SUCCESSFULLY GENERATED  ***',////)
 1020 FORMAT(///,10X,'$$$ ERROR-YOU HAVE ASKED FOR TOO MANY CHARACTERS
     *TO BE DISPLAYED $$$')
 1030 FORMAT(31X,I2,10X,39A2)
 1040 FORMAT(////,35X,'***  SIDE LABEL GENERATION  ***',/////,28X,'TEXT
     *SIZE',14X,'ANNOTATION',//)
 1050 FORMAT(///,10X,'$$$ ERROR-YOU HAVE ASKED FOR TOO MANY LINES  $$$')
      END
```

That which is claimed is:

1. A method for producing a variable amplitude/phase seismic display from a plurality of real seismic wiggle traces, said method comprising the steps of:
   (a) selecting a plurality of data points for each one of said plurality of real seismic wiggle traces, wherein said plurality of data points are equally spaced apart;
   (b) determining the real amplitude for each one of said plurality of data points selected in step (a);
   (c) determining the instantaneous phase of a plurality of complex seismic wiggle traces corresponding to said plurality of real seismic wiggle traces at each one of the data points selected in step (a);
   (d) assigning color one, color two, color three or color four to each data point selected in step (a) based on the instantaneous phase, determined in step (c), at each data point, wherein said colors are assigned in accordance with Table I and wherein BA in Table I is a base angle

TABLE I

| Color | Range |
|---|---|
| one | (BA −90°) to (BA −180°) |
| two | BA to (BA −90°) |
| three | BA to (BA +90°) |
| four | (BA +90°) to (BA +180°); |

(e) assigning a shade of color one, a shade of color two, a shade of color three or a shade of color four to each data point selected in step (a), wherein the darkness of the shade assigned is based on the amplitude determined in step (b) and wherein the particular color applied to each data point is determined by the instantaneous phase in accordance with step (d); and
   (f) plotting the color and shade of color assigned to each data point to produce said variable amplitude/phase seismic display.

2. A method in accordance with claim 1 wherein said data points are four milliseconds apart.

3. A method in accordance with claim 1 wherein said step of determining the instantaneous phase of said plurality of complex seismic wiggle traces comprises:
   (g) applying a Hilbert transform to each one of said plurality of real seismic wiggle traces to convert each one of said plurality of real seismic wiggle traces to a corresponding imaginary seismic wiggle trace;
   (h) determining the amplitude of the plurality of imaginary seismic wiggle traces from step (g) at each data point selected in step (a); and
   (i) determining the instantaneous phase P(t) at each data point selected in step (a) in accordance with equation 1

$$P(t) = \tan^{-1}[h(t)/g(t)] \quad (1)$$

wherein h(t) is the amplitude of the imaginary seismic trace at a data point as determined in step (h), wherein g(t) is the amplitude of the real seismic trace at the same data point as determined in step (b) and wherein each one said plurality of complex seismic wiggle traces is a composite of a real seismic wiggle trace and a corresponding imaginary seismic wiggle trace.

4. A method in accordance with claim 1 wherein the colors assigned in step (d) are assigned in accordance with Table II

TABLE II

| Color | Range |
|---|---|
| one | −90° to −180° |
| two | 0° to −90° |
| three | 0° to +90° |
| four | +90° to +180° |

5. A method in accordance with claim 1 wherein one of sixteen shades of color one, color two, color three or color four is assigned in step (e) to each data point selected in step (a) based on the amplitude determined in step (b).

6. A method in accordance with claim 5 wherein darker shades of color one, color two, color three or color four are assigned for higher amplitudes and lighter shades are assigned for lower amplitudes.

7. A method for producing a variable amplitude/phase seismic display from a plurality of real seismic wiggle traces, said method comprising the steps of:
- (a) selecting a plurality of data points for each one of said plurality of real seismic wiggle traces, wherein said plurality of data points are equally spaced apart;
- (b) determining the real amplitude for each one of the data points selected in step (a);
- (c) determining the instantaneous phase of a plurality of complex seismic wiggle traces corresponding to said plurality of real seismic wiggle traces at each one of the data points selected in step (a);
- (d) assigning one of at least two colors to each data point selected in step (a) based on the instantaneous phase, determined in step (c), at each data point;
- (e) assigning a shade of the color assigned in step (d) to each data point determined in step (a), wherein the darkness of the shade assigned is based on the amplitude determined in step (b); and
- (f) plotting the color and shade of color assigned to each data point to produce said variable amplitude/phase seismic display.

8. A method in accordance with claim 7 wherein said data points are four milliseconds apart.

9. A method in accordance with claim 7 wherein said step of determining the instantaneous phase of said plurality of complex seismic wiggle traces comprises:
- (g) applying a Hilbert transform to each one of said plurality of real seismic wiggle traces to convert each one of said plurality of real seismic wiggle traces to a corresponding imaginary seismic wiggle trace;
- (h) determining the amplitude of the plurality of imaginary seismic wiggle traces from step (g) at each data point selected in step (a); and
- (i) determining the instantaneous phase P(t) at each data point selected in step (a) in accordance with equation 1

$$P(t) = \tan^{-1} [h(t)/g(t)] \qquad (1)$$

wherein h(t) is the amplitude of the imaginary seismic trace at a data point as determined in step (h), wherein g(t) is the amplitude of the real seismic trace at the same data point as determined in step (b) and wherein each one said plurality of complex seismic wiggle traces is a composite of a real seismic wiggle trace and a corresponding imaginary seismic wiggle trace.

10. A method in accordance with claim 7 wherein one of sixteen shades of the color assigned in step (d) is assigned in step (e) to each data point selected in step (a) based on the amplitude determined in step (b).

11. A method in accordance with claim 10 wherein darker shades of the color assigned in step (d) are assigned for higher amplitudes and lighter shades are assigned for lower amplitudes.

* * * * *

UNITED STATES PATENT AND TRADEMARK OFFICE
CERTIFICATE OF CORRECTION

PATENT NO. : 4,661,935

DATED : April 28, 1987

INVENTOR(S) : Clifford L. Shock et al

It is certified that error appears in the above-identified patent and that said Letters Patent is hereby corrected as shown below:

Column 2, immediately after line 45, the following paragraph should be inserted:

---The file of this patent contains at least one drawing executed in color to meet the requirements of 35 USC 112. Copies of this patent with color drawing(s) will be provided by the Patent and Trademark Office upon request and payment of the necessary fee.---

Signed and Sealed this

Thirteenth Day of October, 1987

Attest:

DONALD J. QUIGG

*Attesting Officer*  *Commissioner of Patents and Trademarks*